United States Patent
Seaman

(10) Patent No.: US 10,028,079 B2
(45) Date of Patent: Jul. 17, 2018

(54) ENHANCED SECURITY FOR NEAR FIELD COMMUNICATION ENABLED BLUETOOTH DEVICES

(71) Applicant: Plantronics, Inc., Santa Cruz, CA (US)

(72) Inventor: Timothy E Seaman, San Jose, CA (US)

(73) Assignee: Plantronics, Inc., Santa Cruz, CA (US)

( * ) Notice: Subject to any disclaimer, the term of this patent is extended or adjusted under 35 U.S.C. 154(b) by 100 days.

(21) Appl. No.: 15/204,232

(22) Filed: Jul. 7, 2016

(65) Prior Publication Data

US 2018/0014145 A1  Jan. 11, 2018

(51) Int. Cl.
| | |
|---|---|
| *H04B 7/00* | (2006.01) |
| *H04W 4/00* | (2018.01) |
| *H04W 4/02* | (2018.01) |
| *H04M 1/725* | (2006.01) |
| *H04W 4/80* | (2018.01) |

(52) U.S. Cl.
CPC ......... *H04W 4/008* (2013.01); *H04M 1/7253* (2013.01); *H04W 4/023* (2013.01); *H04W 4/80* (2018.02); *H04M 2250/02* (2013.01)

(58) Field of Classification Search
CPC ..... H04W 12/06; H04W 76/02; H04W 12/02; H04W 84/18; H04W 4/008; H04W 8/005; H04W 12/04; H04W 12/08; H04W 76/023; H04W 84/20; H04W 88/06; H04W 12/00; H04W 52/0245; H04L 63/0853; H04L 2209/80; H04L 63/0428; H04L 63/0492; H04L 63/126; H04L 9/08; H04L 63/083; H04L 63/0861; H04L 63/18; H04L 2463/082; H04L 63/10; H04L 29/12009; H04L 29/12207; H04L 63/107; H04M 1/7253; H04M 2250/02; H04M 1/66; H04M 1/6066; H04M 1/185; H04M 1/72577; H04M 2250/04; H04M 2250/14;
(Continued)

(56) References Cited

U.S. PATENT DOCUMENTS

2007/0197163 A1* 8/2007 Robertson ............. H04L 63/105
                                                                455/26.1
2008/0268776 A1   10/2008 Amendola
(Continued)

OTHER PUBLICATIONS

Unknown, "Safer Use of Pairing and Connection Based on Device Proximity," ip.com publication No. IPCOM000231105D, published on Sep. 27, 2013.

*Primary Examiner* — Golam Sorowar

(57) ABSTRACT

Methods and apparatuses for enhanced security for near field communication Bluetooth devices are described. In one example, a physical proximity of a Bluetooth device is detected with a first near field communications device disposed at a headset base, the Bluetooth device including a second near field communications device. An indication is output at the headset base that a near field communications detect event has occurred. A Bluetooth Secure Simple Pairing process is unlocked at the headset base device for a predetermined unlock time interval responsive to the near field communications detect event. The headset base and the Bluetooth device are paired using the Bluetooth Secure Simple Pairing process, and the Bluetooth Secure Simple Pairing process operation is locked upon completion of the predetermined unlock time interval.

16 Claims, 7 Drawing Sheets

(58) Field of Classification Search
CPC .............. H04M 1/05; H04M 1/72522; H04M 1/72533; H04M 1/72597
See application file for complete search history.

(56) References Cited

U.S. PATENT DOCUMENTS

| | | | |
|---|---|---|---|
| 2011/0028091 A1* | 2/2011 | Higgins | H04L 63/0492 455/41.2 |
| 2011/0210820 A1 | 9/2011 | Talty et al. | |
| 2011/0269502 A1* | 11/2011 | Clark | H04B 1/006 455/552.1 |
| 2016/0255459 A1 | 9/2016 | Sarkar et al. | |

* cited by examiner

ENHANCED SECURITY FOR NEAR FIELD COMMUNICATION ENABLED BLUETOOTH DEVICES

BACKGROUND OF THE INVENTION

Bluetooth is a wireless technology standard for exchanging data over short distances using short-wavelength radio transmissions in the ISM band from 2400-2480 MHz from fixed and mobile devices. Bluetooth uses a process called pairing to control which devices are allowed to connect to a given Bluetooth device and establish a connection without user intervention (e.g., as soon as the devices are in range). The pairing process is triggered either by a specific request from a user to pair devices, or it is triggered automatically when connecting to a service for the first time where the identity of a device is required.

Pairing typically involves some level of user interaction to authenticate the identity of the devices. Once pairing successfully completes, a bond will have been formed between the two devices, enabling the two paired devices to connect to each other in the future without repeating the pairing process. During the Bluetooth pairing process, the two devices involved establish a relationship by creating a link key which is shared and stored on both devices. If a link key is stored by both devices, the devices are said to be paired. The link key is then exchanged in all subsequent transactions. A device that wants to communicate only with a paired device can cryptographically authenticate the identity of the other device to ensure it is the same device it previously paired with. Once a link key has been generated, an authenticated Asynchronous Connection-Less (ACL) link between the devices may be encrypted so that any data exchanged is protected against eavesdropping.

The identity of the devices to be paired may be authenticated using a personal identification number (PIN) code, which may be an ASCII string up to 16 characters in length, for example. If a fixed PIN is associated with a first device, a user of the second device may enter the PIN code associated with the first device into the second device. Upon receiving the correct PIN code, the second device is able to successfully authenticate the first device and the devices establish a communication link, in order to complete the Bluetooth pairing. However, some users may have difficulty typing the code and the manual entry may be viewed by observers.

Many devices employ a simple numeric PIN code, such as a 4-digit PIN code for example, which is frequently fixed in memory at the device (e.g., "0000"). In particular, devices such as headsets that have a limited user interface are likely to have fixed PIN codes. With little or no user interface, devices that use a randomly generated pairing code become very cumbersome as there is no way to relay the code to the user. However, while the "0000" approach works for users/environments where secure device pairing is not important, it is problematic in environments where security is important.

Other Bluetooth devices may utilize the Secure Simple Pairing (SSP) process described in the Bluetooth Specification Revision 2.1, which is hereby incorporated by reference in its entirety. In particular, devices having a limited user interface often employ a simplified version of the "Numeric Comparison" pairing Association Model, where the simplified version is often referred to as "Just Works" pairing. In the "Numeric Comparison" model, both devices to be paired calculate a random six digit user confirmation value that only the devices know and both devices display the number on each device screen. The user compares the displayed numbers to ensure they match and presses a button on each device to confirm. Devices with a limited user interface not having a display may utilize the "Just Works" simplification, whereby user confirmation is assumed and pairing is performed without actual user confirmation of the calculated six digit number. While the "Just Works" approach works offers an optimal user experience in certain devices, current implementations are problematic in environments where security is important.

By itself, the use of a fixed PIN or presumed user confirmation for device pairing is fundamentally insecure, allowing an unauthorized device to pair with a target device when the target device is in pairing mode. Bluetooth security attacks include eavesdropping, unauthorized device control, unauthorized access to personal data, denial of service, and identity detection. Bluetooth devices may be subject to "Man-in-the-Middle" attacks, whereby an unauthorized device (also referred to as a rogue device) insinuates itself in the pairing process between two legitimate devices. The unauthorized device responds to both legitimate devices during the pairing process, fooling the legitimate devices into believing they have located each other. Instead, the legitimate devices are communicating with and through the unauthorized device, enabling the unauthorized device full trust of both devices. The unauthorized device is thus enabled to eavesdrop on communications and take control of the legitimate devices. Bluetooth headsets in particular are vulnerable to compromised telephony commands which hijack the functions and content of an associated mobile phone as well as compromised voice conversations.

As a result, improved methods and apparatuses for pairing of wireless devices are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
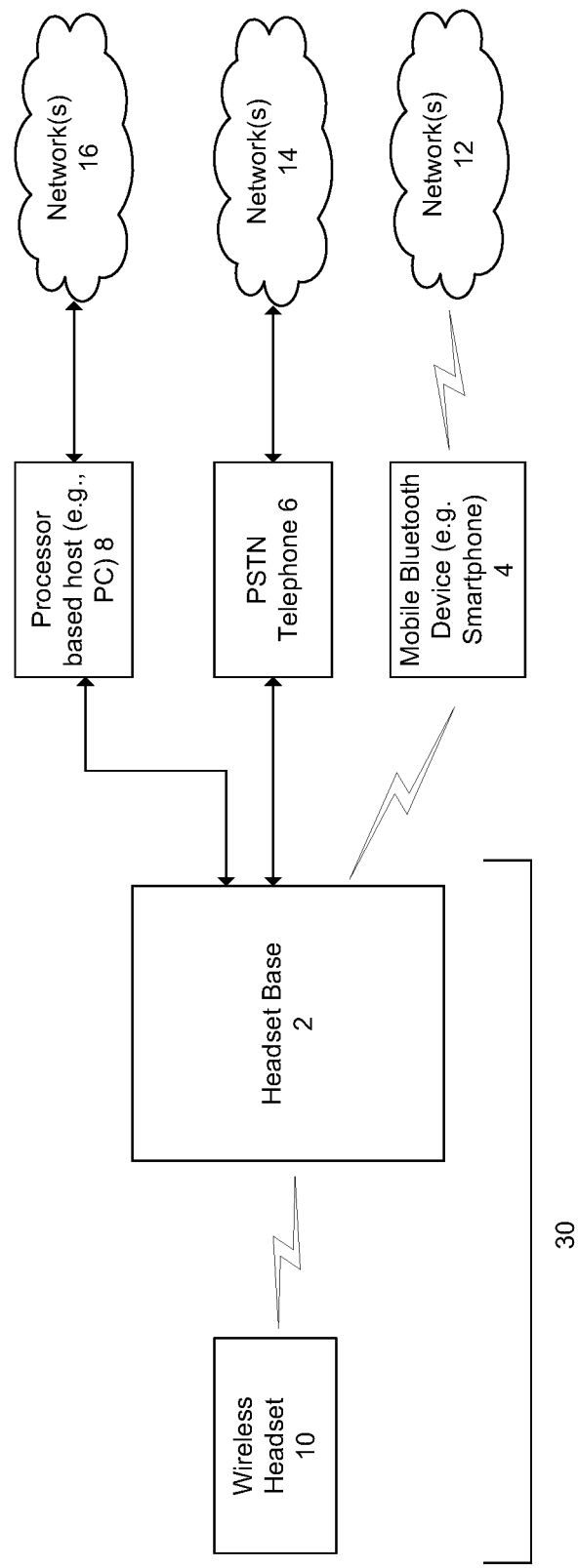
FIG. 1 illustrates an exemplary embodiment of a headset base system having enhanced Bluetooth pairing security.

Methods and apparatuses for enhanced security for near field communications enabled Bluetooth devices are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

The inventor has recognized certain security limitations in current pairing processes, particularly for those devices including near field communications (NFC) devices. Many Bluetooth devices (e.g., Bluetooth headsets) include a passive NFC tag integrated circuit (IC) and have Secure Simple Pairing (SSP) always enabled. With an NFC tag IC included in a Bluetooth device (i.e., the target device), any NFC read capable device (e.g., a smartphone) and supporting software may readily read and store the target device's Bluetooth address (BD_ADDR) and additional unique information needed to pair and connect to the target device. Utilizing Secure Simple Pairing, this information is used to easily auto-pair the NFC capable smartphone to the target device.

As described previously, Secure Simple Pairing poses security challenges. These challenges are magnified with devices utilizing NFC. It is possible for an unauthorized person (also referred to herein as an eavesdropper), to gain momentary access to an unsecured and/or unattended target device long enough to read the NFC tag IC and get the target device's specific Bluetooth Pairing data. This action only requires a few seconds of proximity to the target device (e.g., 1 or 2 seconds of time and 2-3 cm distance).

The inventor has recognized this security vulnerability is particularly problematic where the target Bluetooth device is a headset base. Headset bases are relatively large devices typically sitting on someone's desk near their computer and/or desk phone, and an eavesdropper device (e.g., the smartphone) needs to just be waved in front of the base for a few seconds. Once the headset base Bluetooth Pairing data is read, the eavesdropper can immediately pair to the target device (e.g., the headset base), or optionally delay pairing to the target device for a more opportune time and place. For example, the eavesdropper can wait for the desired conversation to eavesdrop on and when the victims aren't paying attention to their headset base.

In cases where the headset base does not support multipoint mode, it is advantageous for the eavesdropper to delay unauthorized pairing. Specifically, if the eavesdropper were to immediately pair to the headset base, the victim may notice this event and will then be aware his headset base has been compromised. If the headset base has not been paired, then the eavesdropper immediate pairing may be indicated via an LED on the headset base. If the headset base is already paired to the victim's headset, they may take notice that it is not working between the time the eavesdropper immediately paired their device and the targeted conversation the eavesdropper wishes to listen in on. As such, it is advantageous for the eavesdropper to delay the pairing event to reduce the risk of the victim noticing the hijacking of his device, and perform the pairing close in time to the desired conversation to eavesdrop on, when the victims aren't necessarily paying close attention to their target device.

The inventor has recognized scenarios where unauthorized parties may eavesdrop on a conversation using a target device's microphone. In one scenario, the eavesdropper has momentary access to the target device. The eavesdropper obtains the target device's Bluetooth pairing data by performing a close-by scan of the target device's NFC tag IC. The target device is in the physical vicinity of the desired conversation to listen in on (e.g. user's cubicle, private office, etc.), and the target device is not actively paired or in use. The eavesdropper is within Bluetooth range (~10 m or 30 ft) of the target device so that they may gain access to an audio conversation. In one example, the eavesdropper uses two smartphones, one with NFC pairing capability. The eavesdropper uses the first smartphone to pair to the target device. The eavesdropper uses the second smartphone to call the first smartphone. The eavesdropper answers the call on the first smartphone, and mutes the microphone on the second smartphone. The first smartphone's microphone and speaker are now connected to the target device. The eavesdropper may now casually and unknowingly listen to the private conversation (on the second smartphone) using the user's own target device's microphone. In one example of the invention, methods and apparatuses are presented to prevent an eavesdropper, after gaining access to a Bluetooth device, at a later time remotely gaining access to the device's microphone to eavesdrop on a conversation.

In one example of the invention, a headset base includes an NFC tag IC (also referred to herein as an NFC chip or device) which includes a Field-Detect output pin. This output signal drives an input pin on the headset base microcontroller to signal the firmware that the NFC tag IC was just scanned by an NFC reader. This event is used to signal the firmware that a Bluetooth pairing process is commencing. Unlike Bluetooth devices which use a simple passive NFC tag IC, in this case the Bluetooth Secure Simple Pairing is nominally disabled at all times, except for a very limited period of time from the Field-Detect event. For example, the enabled period of time is approximately 30 seconds.

By this method, a mobile Bluetooth device (e.g., a smartphone) pairing event to the headset base (e.g., a headset base system) can only be completed when the smartphone and headset base are within close proximity (e.g., 2-3 cm) and a very limited time after the proximity event (e.g. 20 or 30 seconds). Any attempt to pair to the headset base at a later time, even with the correct BD_ADDR and other pairing information, will fail since the Bluetooth Secure Simple Pairing is disabled. Advantageously, this prevents Bluetooth device microphone eavesdropping for unintended listening to a private conversation. This provides added security for devices utilized in sensitive applications.

In one example of the invention, a method includes detecting with a first near field communications device disposed at a headset base a physical proximity of a Bluetooth device, the Bluetooth device including a second near field communications device. The method includes outputting an indication at the headset base that a near field communications detect event has occurred. The method further includes unlocking a Bluetooth Secure Simple Pairing process at the headset base device for a predetermined unlock time interval responsive to the near field communications detect event, wherein the Bluetooth Secure Simple Pairing process is unlocked from a locked state during which the headset base rejects all pairing requests. The method further includes pairing the headset base and the Bluetooth device using the Bluetooth Secure Simple Pairing process, and locking the Bluetooth Secure Simple Pairing process operation upon completion of the predetermined unlock time interval.

In one example, a headset base includes a processor, a wireless communications transceiver utilizing a wireless communications protocol for communication with a wireless headset, and a Bluetooth transceiver for communication with a Bluetooth device. The headset base includes a near field communications device operable to output an indication that a near field communications detect event has occurred. The headset base further includes a Bluetooth Secure Simple Pairing module for Bluetooth Secure Simple Pairing, the Bluetooth Secure Simple Pairing module configured to be operable in an unlocked state and operable to be locked in a locked state during which the headset base rejects all pairing requests.

The headset base further includes one or more computer memories storing one or more application programs comprising computer executable instructions configured to detect with the near field communications device a physical proximity of a Bluetooth device and output an indication that a near field communications detect event has occurred. The program executable instructions are further configured to unlock the Bluetooth Secure Simple Pairing module for a predetermined unlock time interval responsive to the near field communications detect event, wherein Bluetooth Secure Simple Pairing is unlocked from the locked state. The program executable instructions are further configured to pair the headset base and the Bluetooth device using Bluetooth Secure Simple Pairing, and lock the Bluetooth Secure Simple Pairing module to the locked state upon completion of the predetermined unlock time interval.

In one example, a method includes operating a headset base device in either a pairing mode unlocked state or a pairing mode locked state, wherein during the locked state the headset base device is locked from performing a pairing operation and rejects all pairing requests. The method includes receiving at the headset base device during the locked state a pairing request from a Bluetooth device, where the pairing request includes pairing credentials. The method includes rejecting the pairing request.

The method further includes detecting with a first near field communications device disposed at the headset base device a physical proximity of a Bluetooth device, and outputting an indication that a near field communications detect event has occurred. The method includes entering the pairing mode unlocked state at the headset base device for a predetermined unlock time interval responsive to the near field communications detect event, wherein the Bluetooth Secure Simple Pairing is unlocked from the pairing mode locked state during which the headset base rejects all pairing requests. The method further includes pairing the headset base and the Bluetooth device using Bluetooth Secure Simple Pairing, and entering the pairing mode locked state upon completion of the predetermined unlock time interval.

FIG. 1 illustrates an exemplary embodiment of a headset base system having enhanced Bluetooth pairing security. As shown, a wireless headset system 30 generally includes a headset base 2 and a wireless headset 10. The wireless headset 10 is in wireless communication, e.g., using radio frequency (RF) technology, with the headset base 2.

The headset base 2 may include a base DECT (Digital Enhanced Cordless Telecommunications) baseband microcontroller to implement DECT compliant technology. A headset DECT baseband microcontroller may also be provided in the wireless headset 10 to communicate with the base DECT controller. It is to be understood that while the headset system 30 is described herein to implement the DECT compliant technology, other technologies, protocols and/or standards may be similarly implemented. The headset base 2 may implement DECT, a European cordless phone standard, or any other suitable protocol and/or standard for communications with wireless headset 10.

Headset base 2 is capable of communication with a mobile (i.e., wireless) Bluetooth device 4 (e.g., a smartphone), via a Bluetooth link. Mobile Bluetooth device 4 may be in communication with one or more networks 12 for receiving incoming calls and making outgoing calls. The networks 12 may include, for example, one or more of a cellular communications network, the Internet, a LAN, etc. Mobile Bluetooth device 4 and headset base 2 utilize an enhanced Bluetooth pairing security method and apparatus as described herein.

Headset base 2 is in communication with a public switched telephone network (PSTN) telephone 6 via a connection such as a telephone interface cable utilizing RJ11 connectors. PSTN telephone 6 may be in communication with one or more networks 14 for receiving incoming calls and making outgoing calls. The networks 14 may include, for example, the PSTN.

Headset base 2 is in communication with a processor-based host 8 executing a softphone application. The headset base 2 may be similarly implemented and/or utilized with various other host mediated network communication applications such as intercom, Internet chat, Internet telephony, voice over data such as VoIP softphone, and the like. The headset base 2 is in communication with the host 8 such as via a connection to a Universal Serial Bus (USB) port provided on the host 8 or any other suitable communication port or mechanism. For example, although a wired connection is typically employed between the headset base 2 and the host 8, wireless connections may alternatively be employed. The term "connection" utilized herein generally refers to both wired and wireless connections. In addition, the wireless headset 10 and/or the headset base 2 may be selectively powered on or off and thus be selectively in communication with each other and/or with the host 8.

The processor-based host 8 may be in communication with one or more networks 16 for receiving incoming and sending outgoing communication calls. The network 16 may be for example, the Internet, an intranet network, or a LAN (local area networks). Although not shown, the networks 12, 14, 16 may be in communication with other networks including, for example, a public switched telephone network (PSTN) or a Private Branch Exchange (PBX) for completing a communication call on a remote end to a remote call recipient or remote caller. The processor-based host 8 generally can be any suitable processor-based device such as a personal computer (PC) or a processor-based telephone.

The processor-based host 8 and headset base 2 may be implemented with voice over Internet Protocol (VoIP) technology for receiving incoming and making outgoing communication calls via the network 16. In particular, the host 8 may execute software applications such as a VoIP telephony software application and a wireless headset softphone-headset integrator application to facilitate the receiving of incoming and the placing of outgoing communication calls using the wireless headset 10 via the headset base 2.

The headset base 2 not only facilitates communication between the wireless headset 10 and mobile Bluetooth device 4, PSTN telephone 6, and/or host 8, but may optionally also serve as a cradle to facilitate storage of the wireless headset 10 and recharging of a rechargeable battery contained in the wireless headset 10. It is noted that a docking and/or charging portion or component of the headset base 2 may be physically integrated with the headset base 2 or may be a physically separate component from the remainder of the headset base 2. The headset base 2 may be powered via a USB connection but can be alternatively or additionally be powered via an external power source such as via an alternating current (AC) adapter.

Figure 2:
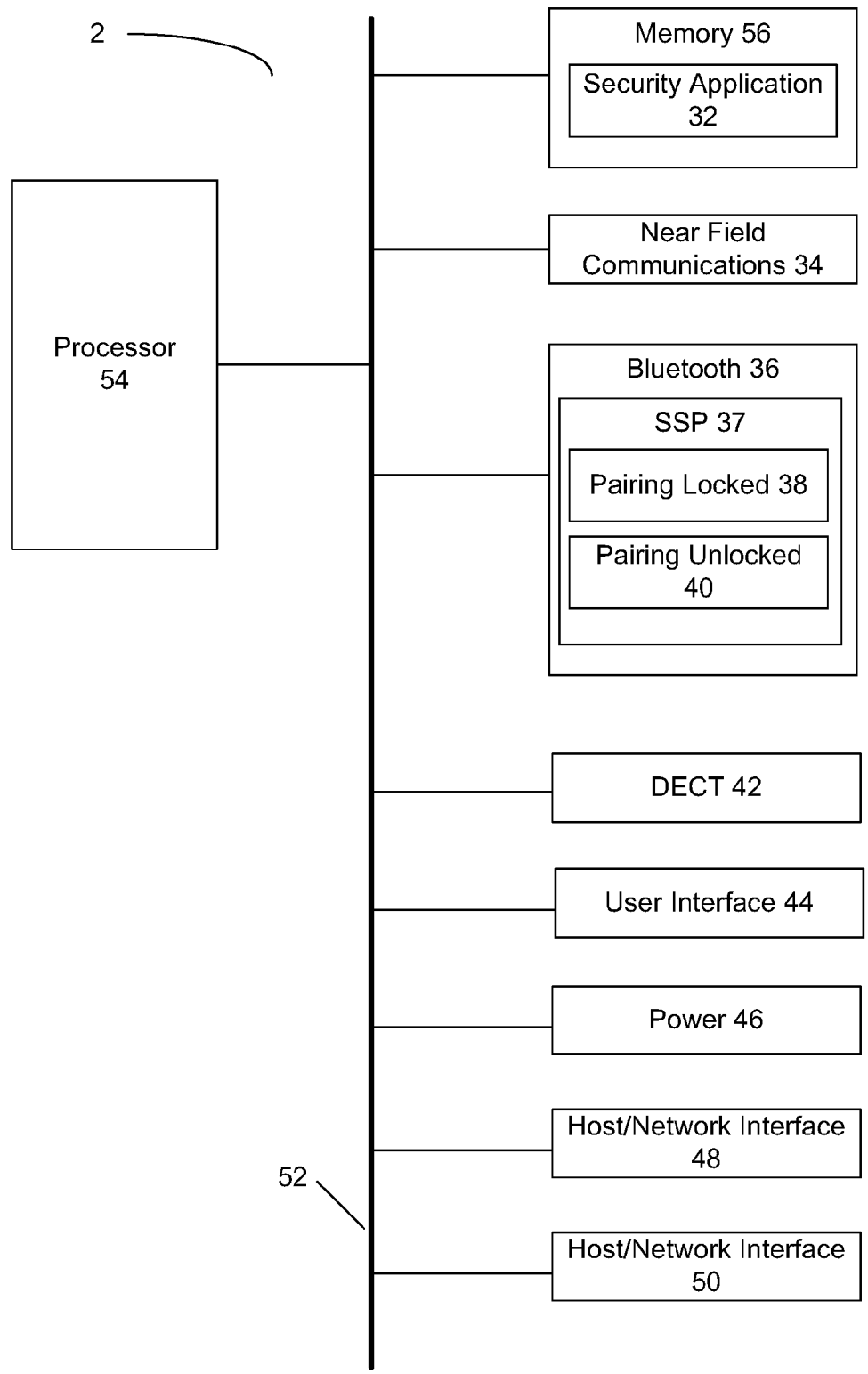
FIG. 2 illustrates a simplified block diagram of the headset base shown in FIG. 1.

FIG. 2 illustrates a simplified block diagram of the headset base 2 with a security application 32. Headset base 2 includes a processor 54 operably coupled via an interconnect 52 to a computer readable memory 56, a near field communications (NFC) device 34, a Bluetooth module 36 having a Bluetooth transceiver, a DECT wireless transceiver 42, a user interface 44, and a power interface 46, a host/network interface 48, and a host/network interface 50. Bluetooth module 36 stores pairing information of headset base 2, e.g., the 48-bit Bluetooth device address ("BD_ADDR") that is a unique value assigned to Bluetooth module 36. The 48-bit BD_ADDR is utilized to generate the link key during the pairing process. Similarly, a Bluetooth module at mobile Bluetooth device 4 stores a unique Bluetooth device address.

NFC device 34 is operable to output an indication that a near field communications detect event has occurred. In one example, NFC device 34 is a NFC tag chip operable to output a field detect signal when in close proximity to a corresponding NFC tag chip at mobile Bluetooth device 4. NFC devices utilize communication standards which enable devices to initiate applications or exchange data automatically when they are brought in close proximity, for example less than 10 centimeters, depending on the system. NFC devices employ electromagnetic induction between two loop antennae when NFC devices exchange information. The NFC interface operates in the globally available unlicensed radio frequency ISM band of 13.56 MHz on ISO/IEC 18000-3 air interface at rates ranging from 106 to 424 kbit/s.

In one example, NFC device 34 operates in a NFC peer-to-peer mode. NFC peer-to-peer mode enables two NFC-enabled devices to communicate with each other to exchange information in an adhoc fashion. NFC requires an initiator device and a target device; the initiator actively generates an RF field that can power a passive target. In one example, NFC device 34 operates in active mode, whereby both initiator and target device communicate by alternately generating their own fields. A device deactivates its RF field while it is waiting for data. In this mode, both devices (e.g., headset base 2 and mobile Bluetooth device 4) have power supplies.

In one example, Bluetooth module 36 utilizes the Secure Simple Pairing (SSP) process described in the Bluetooth Specification Revision 2.1, which is hereby incorporated by reference in its entirety. Secure Simple Pairing was created to address security and simplicity of the pairing process. SSP has four potential modes of operation: Just Works, Out-Of-Band (OOB), Numeric Comparison, and Passkey Entry.

In one example, Bluetooth module 36 utilizes SSP "Just Works" pairing. In SSP, devices having a limited user interface often employ a simplified version of the "Numeric Comparison" pairing Association Model, where the simplified version is often referred to as "Just Works" pairing. In the "Numeric Comparison" model, both devices to be paired calculate a random six digit user confirmation value that only the devices know and both devices display the number on each device screen. The user compares the displayed numbers to ensure they match and presses a button on each device to confirm. Devices with a limited user interface not having a display may utilize the "Just Works" simplification, whereby user confirmation is assumed and pairing is performed without actual user confirmation of the calculated six digit number. In further examples, Bluetooth module 36 may utilize a SSP Pass Key Entry, Out-of-Bounds, or Numeric Comparison pairing model. OOB pairing uses an external means of communication (i.e., outside of the normal 2.4 GHz Bluetooth physical layer) to exchange information in the pairing process. Typical information exchanged using OOB pairing includes the device ID and the Bluetooth link key.

Bluetooth module 36 includes a Bluetooth Secure Simple Pairing module 37 for Bluetooth Secure Simple Pairing. The Bluetooth Secure Simple Pairing module 37 is configured to be operable in a pairing unlocked state 40 and operable to be locked in a pairing locked state 38. During pairing locked state 38 the headset base 2 rejects all SSP pairing requests and/or refuses to enter pairing mode upon request by another device. In one example, Bluetooth module 36 is utilized for communications with mobile Bluetooth device 4 shown in FIG. 1.

In one example, DECT wireless transceiver 42 is utilized for communications with wireless headset 10 shown in FIG. 1. Headset base 2 may also include an IEEE 802.11 transceiver. In other examples, headset base 2 may support other networking standards.

Host/network interface 48 may be a personal computer interface and/or network interface. In one example, the host/network interface 48 is a USB interface for coupling to host 8 shown in FIG. 1. For example, the host/network interface 48 may be an interface to a public switched telephone network, integrated services digital network, local area network, or wireless local area network. In one example, the host/network interface 50 is a PSTN interface for coupling to PSTN telephone 6 shown in FIG. 1. Host/network interface 50 may be an interface to a public switched telephone network, integrated services digital network, local area network, or wireless local area network.

Processor 54 allows for processing data, including managing data between near field communications device 34, Bluetooth module 36, and memory 56 for controlling the pairing state (i.e., locked or unlocked) of headset base 2. Processor 54 may include a variety of processors (e.g., digital signal processors), with conventional CPUs being applicable.

Computer readable memory 56 may include a variety of memories, and in one example includes SDRAM, ROM, flash memory, or a combination thereof. Computer readable memory 56 may further include separate memory structures or a single integrated memory structure. In one example, computer readable memory 56 may be used to store pairing data, network and telecommunications programs, and/or an operating system (OS).

Computer readable memory 56 stores a security application 32 executed by processor 54 to operate headset base 2 in a pairing locked state 38 or pairing unlocked state 40. Memory 56 may store pairing data for use by security application 32 to effectuate pairing. Memory 56 also includes a base station control application and a user interface application. User interface 44 allows for manual communication between the base station user and the base station, and in one example includes an audio and/or visual interface.

Referring now to FIG. 2 in conjunction with FIG. 1, in one example operation, security application 32 causes the headset base 2 to detect with the near field communications device 34 a physical proximity of mobile Bluetooth device 4 and output an indication that a near field communications detect event has occurred. Security application 32 unlocks the Bluetooth Secure Simple Pairing module for a predetermined unlock time interval responsive to the near field communications detect event. Bluetooth Secure Simple Pairing is unlocked from the pairing locked state 38 and enters the pairing unlocked state 40. The headset base 2 and the mobile Bluetooth device 4 are then paired using Bluetooth Secure Simple Pairing. For example, the predetermined unlock time interval during which the Bluetooth Secure Simple Pairing module is in the unlocked state is between 20 and 40 seconds.

The Bluetooth Secure Simple Pairing module is then locked to the locked state 38 upon completion of the predetermined unlock time interval. In operation during the locked state 38, if the headset base 2 receives a pairing request from a Bluetooth device, it rejects the pairing request. The pairing request is rejected even if the pairing requests includes otherwise valid pairing credentials, such as a Bluetooth device address.

Once paired, headset base 2 is operable to transmit and receive an audio signal between the headset base 2 and the mobile Bluetooth device 4 over a Bluetooth link using Bluetooth module 36. Headset base 2 is also operable to transmit and receive the audio signal between the headset base 2 and the wireless headset 10 using the DECT transceiver 42. For example, the audio signal includes telephony voice communications between a wearer of the wireless headset 10 and a far-end call participant.

In one example, headset base 2 is an access point (AP), which is operably coupled with a communications network. The AP includes a transceiver and a processor configured to allow a wireless device (e.g., a headset) access to a network connected to the access point (e.g., via a 10/200 Ethernet RJ-45 port). The AP may be any device that allows wireless-equipped computers and other devices to communicate with a wired network.

Figure 3:
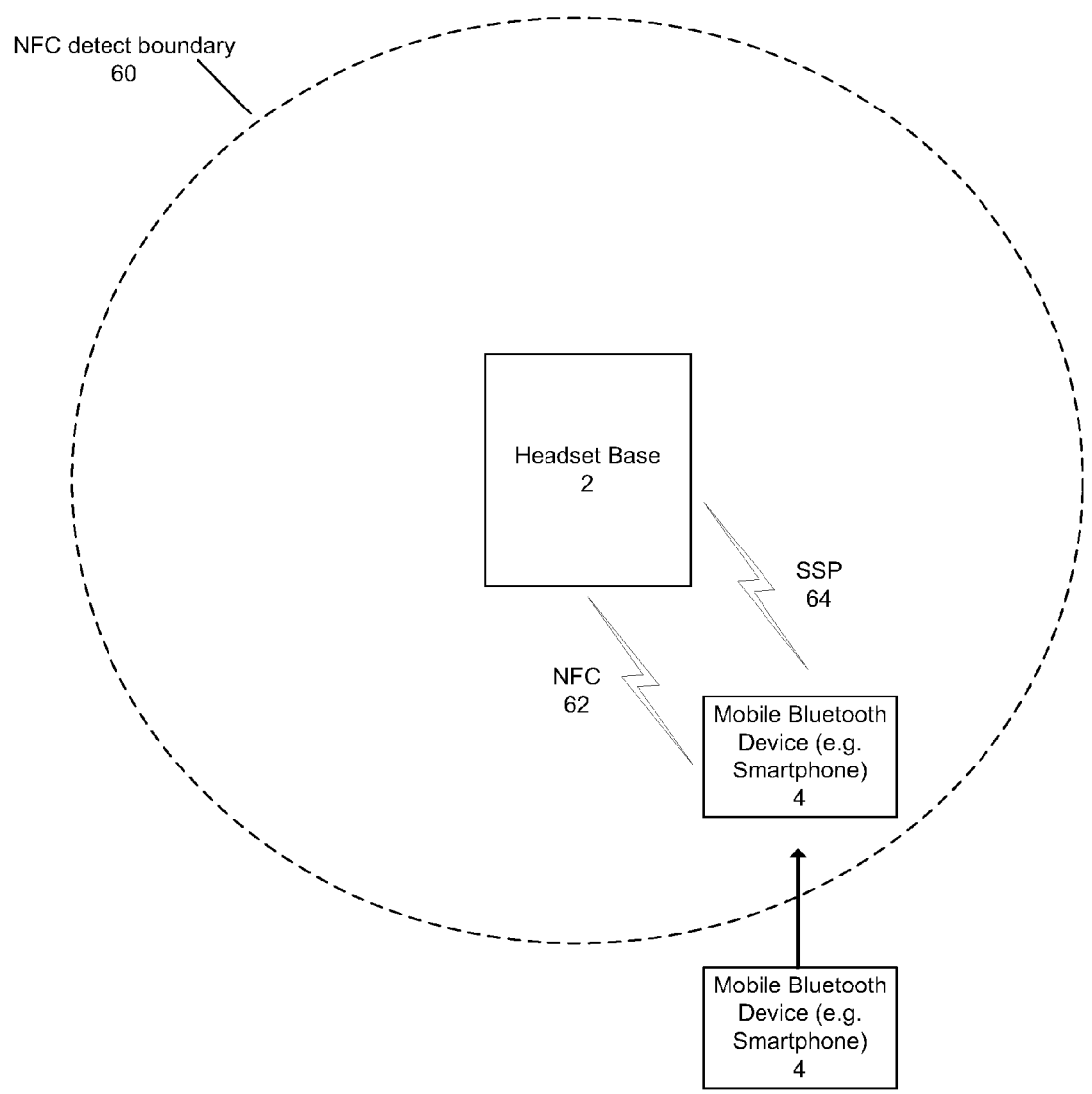
FIG. 3 illustrates an example usage scenario for Bluetooth Secure Simple Pairing where a mobile Bluetooth device transitions from outside to inside a NFC detect boundary.

FIG. 3 illustrates an example usage scenario for Bluetooth Secure Simple Pairing where a mobile Bluetooth device 4 transitions from outside to inside a NFC detect boundary 60, in accordance with an aspect of the present invention. Referring to both FIG. 1 and FIG. 3, mobile Bluetooth device 4 and the headset base 2 are capable of wireless communication there between utilizing both Bluetooth communications and Near Field Communications (i.e., both mobile Bluetooth device 4 and headset base 2 have Bluetooth modules and NFC devices). A NFC detect boundary 60 establishes a range from headset base 2 below which mobile Bluetooth device 4 is detected by a NFC device at headset base 2 and beyond which mobile Bluetooth device 4 is out of range to be detected utilizing NFC. Beyond NFC detect boundary 60, mobile Bluetooth device 4 and headset base 2 can no longer initiate or maintain NFC communications. In one example, NFC detect boundary 60 is approximately 10 cm from headset base 2.

In the example shown in FIG. 3, headset base 2 detects that mobile Bluetooth device 4 has moved from outside NFC detect boundary 60 to within NFC detect boundary 60. The headset base 2 outputs an indication that a near field communications detect event has occurred. Responsive to this near field communications detect event, headset base 2 unlocks Bluetooth Secure Simple Pairing for a predetermined unlock time interval. In particular, Bluetooth Secure Simple Pairing is unlocked from a locked state, whereby in the locked state headset base 2 rejects all pairing requests. In the locked state, pairing requests are rejected even if including valid pairing credentials. For example, the predetermined unlock time interval during which Bluetooth Secure Simple Pairing at the headset base 2 device is unlocked from the locked state is between 20 and 40 seconds.

Mobile Bluetooth device 4 reads the BD_ADDR from headset base 2, and the headset base 2 and the mobile Bluetooth device 4 are then paired using Bluetooth Secure Simple Pairing. Bluetooth Secure Simple Pairing operation is then returned to the locked state upon completion of the predetermined unlock time interval. Once pairing is complete, standard Bluetooth communications may be employed between headset base 2 and mobile Bluetooth device 4. For example, an audio signal including user speech is transmitted between headset base 2 and mobile Bluetooth device 4.

Figure 4:
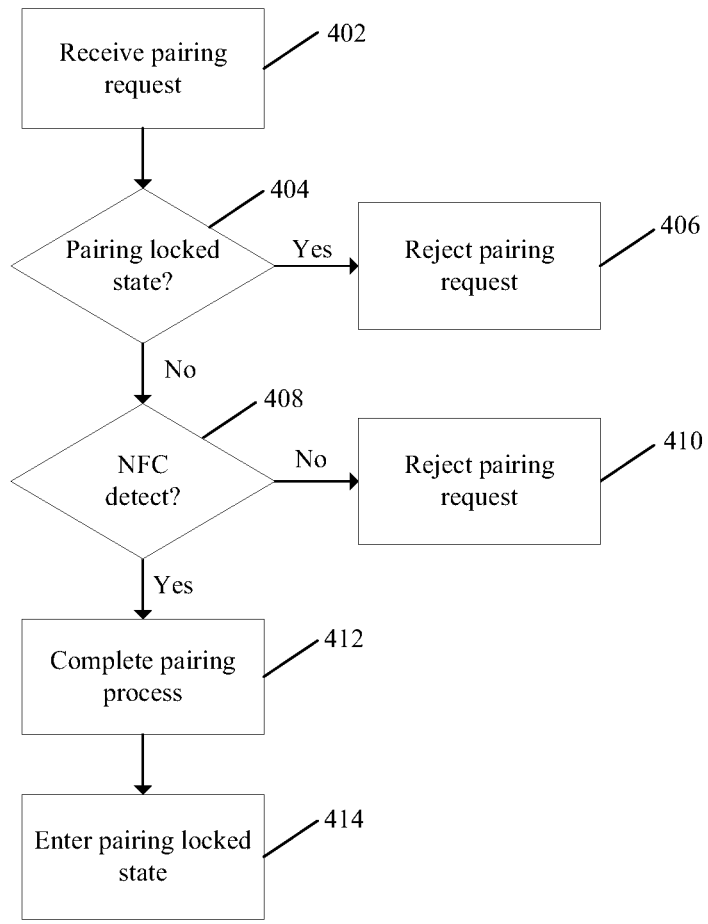
FIG. 4 is a flow diagram illustrating an enhanced security Bluetooth pairing process.

FIG. 4 is a flow diagram illustrating an enhanced security Bluetooth pairing process. In one example, the process is implemented at a headset base. At block 402, a headset base receives a pairing request from a mobile Bluetooth device. At decision block 404, it is determined whether the headset base is in a pairing locked state at the time the pairing request is received.

If yes at decision block 404, at block 406 the pairing request is rejected. If no at decision block 404, at decision block 408 it is determined whether NFC detection is present. If no at decision block 408, at block 410 the pairing request is rejected. If yes at decision block 408, at block 412 pairing is unlocked and the pairing process is performed and completed between the headset base and the mobile Bluetooth device. Following a predetermined time interval after the pairing is unlocked, at block 414 the headset base pairing state is returned to a locked state. In a further example, the headset base pairing state may be returned to the locked state at block 414 once the pairing process is completed.

Figure 5:
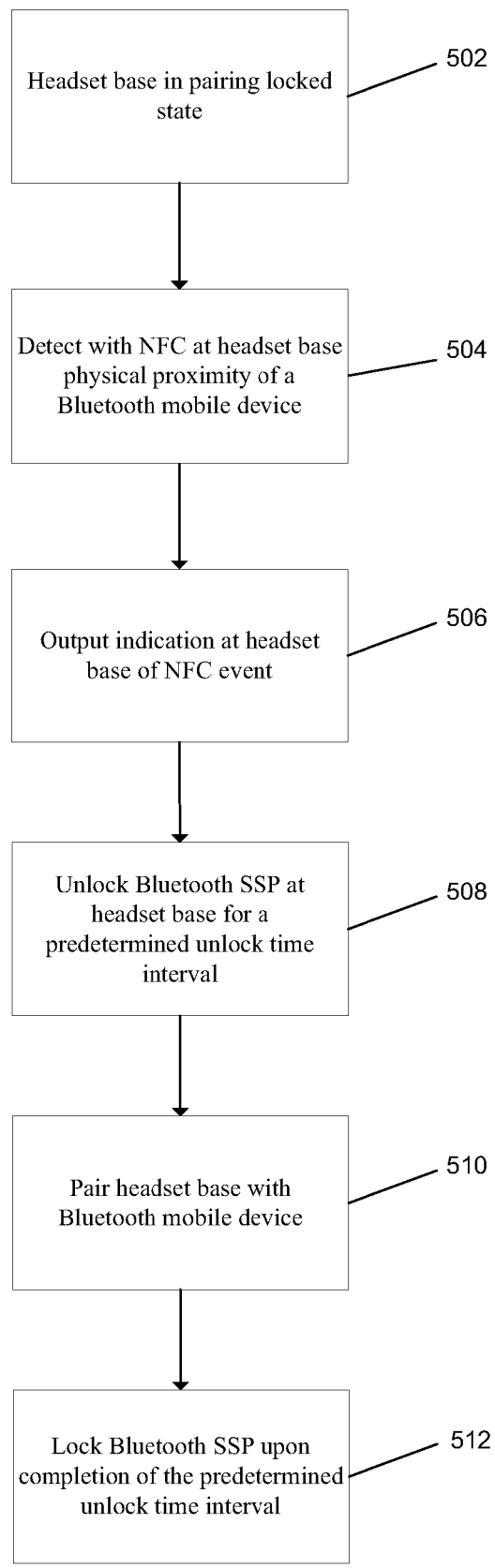
FIG. 5 is a flow diagram illustrating an enhanced security Bluetooth pairing process of a headset base.

FIG. 5 is a flow diagram illustrating an enhanced security Bluetooth pairing process of a headset base. At block 502, a headset base is in a pairing locked state. During the pairing locked state, the headset base rejects all pairing requests. For example, if the headset base 2 receives during the locked state a pairing request from a mobile Bluetooth device, the pairing request is rejected even if the pairing request includes valid pairing credentials (e.g., a valid Bluetooth device address).

At block 504, a physical proximity of a mobile Bluetooth device is detected with a near field communications device disposed at the headset base, where the mobile Bluetooth device also has a near field communications device. In one example, the mobile Bluetooth device is a smartphone. At block 506, an indication is output at the headset base that a near field communications detect event has occurred, At block 508, Bluetooth Secure Simple Pairing is unlocked at the headset base device for a predetermined unlock time interval responsive to the near field communications detect event. The Bluetooth Secure Simple Pairing is unlocked from the pairing locked state. In one example, the predetermined unlock time interval during which Bluetooth Secure Simple Pairing at the headset base device is unlocked from the locked state is between 20 and 40 seconds.

At block 510, the headset base and the mobile Bluetooth device are paired using Bluetooth Secure Simple Pairing. At block 512, Bluetooth Secure Simple Pairing operation at the headset is locked upon completion of the predetermined unlock time interval (i.e., the headset base is returned to a pairing locked state).

Once paired, the headset base 2 and mobile Bluetooth device may form a Bluetooth communications link for date transfer. For example, an audio signal is transmitted between the headset base and the mobile Bluetooth device over a Bluetooth link. This audio signal may also be transmitted between the headset base and a wireless headset using a second wireless communications link. For example, the second wireless communications link is a DECT link between a first DECT transceiver disposed at the headset base and a second DECT transceiver disposed at the wireless headset. The audio signal may include telephony voice communications between a wearer of the wireless headset and a far-end call participant (e.g., the mobile Bluetooth device is a smartphone conducting a telephony call utilizing a cellular communication network).

Figure 6A:
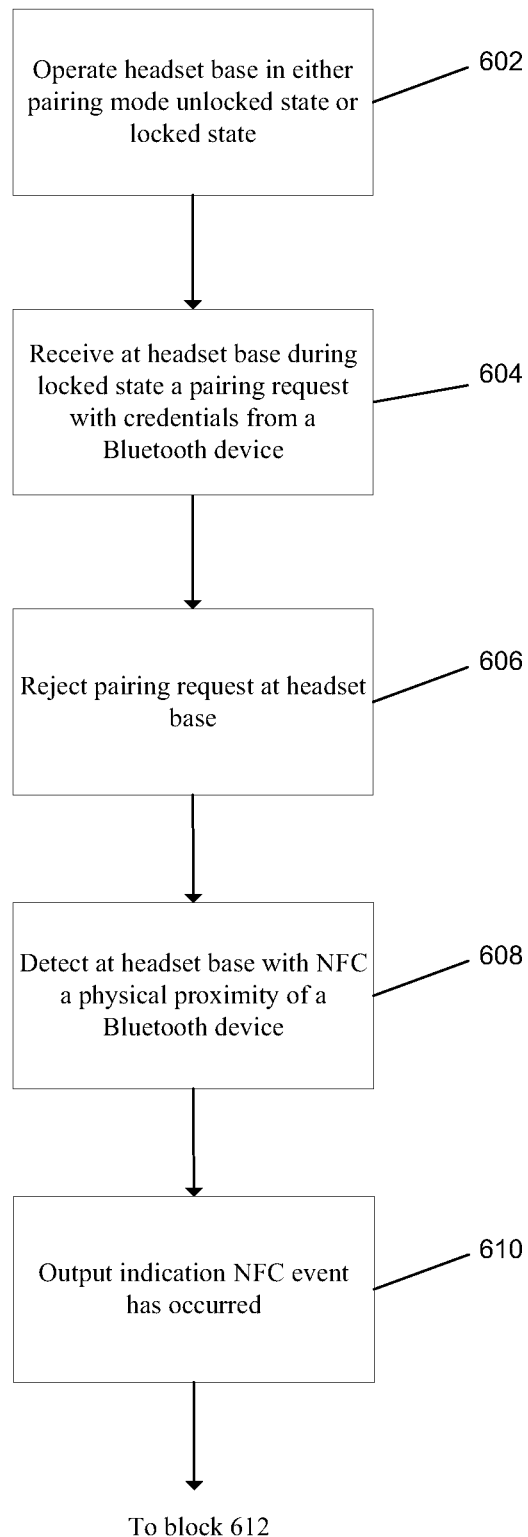
FIGS. 6A and 6B are a flow diagram illustrating an enhanced security Bluetooth pairing process of a headset base in a further example.
Figure 6B:
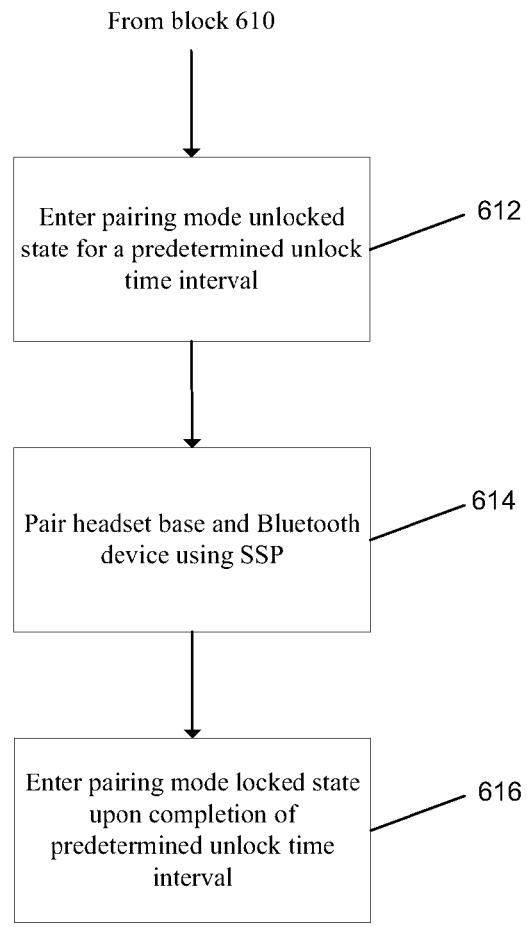

FIGS. 6A and 6B are a flow diagram illustrating an enhanced security Bluetooth pairing process of a headset base in a further example. At block 602, a headset base device is operated in either a pairing mode unlocked state or a pairing mode locked state. During the pairing mode locked state the headset base device is locked from performing a pairing operation and rejects all pairing requests.

At block 604, the headset base device receives during the locked state a pairing request including pairing credentials from a Bluetooth device. At block 606, the pairing request is rejected. At block 608, a first near field communications device disposed at the headset base device detects a physical proximity of a Bluetooth device. At block 610, an indication is output that a near field communications detect event has occurred.

At block 612, the pairing mode unlocked state is entered at the headset base device for a predetermined unlock time interval responsive to the near field communications detect event, whereby Bluetooth Secure Simple Pairing is unlocked from the pairing mode locked state. At block 614, the headset base and the Bluetooth device are paired using Bluetooth Secure Simple Pairing. At block 616, the pairing mode locked state is re-entered upon completion of the predetermined unlock time interval.

While the exemplary embodiments of the present invention are described and illustrated herein, it will be appreciated that they are merely illustrative and that modifications can be made to these embodiments without departing from the spirit and scope of the invention. Certain examples described utilize headsets which are particularly advantageous for the reasons described herein. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method comprising:
receiving at a headset base, while a Bluetooth Secure Simple Pairing process of the headset base is in a locked state during which the headset base rejects all pairing requests, a pairing request from a Bluetooth device, the pairing request comprising pairing credentials, wherein the pairing credentials comprise a Bluetooth device address;
rejecting the pairing request;
detecting with a first near field communications device disposed at the headset base, while the Bluetooth Secure Simple Pairing process of the headset base is in the locked state, a physical proximity of the Bluetooth device, the Bluetooth device including a second near field communications device;
outputting an indication at the headset base that a near field communications detect event has occurred;
in response to the near field communications detect event, unlocking the Bluetooth Secure Simple Pairing process at the headset base for a predetermined unlock time interval and, during the predetermined unlock time interval, pairing the headset base with the Bluetooth device by exchanging pairing information on a 2.4 GHz physical layer using the Bluetooth Secure Simple Pairing process; and
locking the Bluetooth Secure Simple Pairing process operation upon completion of the predetermined unlock time interval.

2. The method of claim 1, wherein the Bluetooth device is a smartphone.

3. The method of claim 1, further comprising:
transmitting and receiving an audio signal between the headset base and the Bluetooth device over a Bluetooth link; and
transmitting and receiving the audio signal between the headset base and a wireless headset using a second wireless communications link.

4. The method of claim 3, wherein the second wireless communications link comprises a DECT link between a first DECT transceiver disposed at the headset base and a second DECT transceiver disposed at the wireless headset, and wherein the audio signal comprises telephony voice communications between a wearer of the wireless headset and a far-end call participant.

5. The method of claim 1, wherein the predetermined unlock time interval during which the Bluetooth Secure Simple Pairing process at the headset base device is unlocked from the locked state is between 20 and 40 seconds.

6. The method of claim 1, wherein the exchange of the pairing information using the Bluetooth Secure Simple Pairing process, between the headset base and the Bluetooth device, only proceeds after the first near field communications device at the headset base has previously detected the second near field communications device.

7. A headset base comprising:
a processor;
a wireless communications transceiver utilizing a wireless communications protocol for communication with a wireless headset;
a Bluetooth transceiver for communication with a Bluetooth device;
a near field communications device operable to output an indication that a near field communications detect event has occurred;

a Bluetooth Secure Simple Pairing module for Bluetooth Secure Simple Pairing, the Bluetooth Secure Simple Pairing module configured to be operable in an unlocked state and operable to be locked in a locked state during which the headset base rejects all pairing requests; and one or more computer memories storing one or more application programs comprising computer executable instructions configured to:
receive, while the Bluetooth Secure Simple Pairing module of the headset base is in the locked state, a pairing request from a Bluetooth device, the pairing request comprising pairing credentials, wherein the pairing credentials comprise a Bluetooth device address;
reject the pairing request;
detect with the near field communications device, while the Bluetooth Secure Simple Pairing module of the headset base is in the locked state, a physical proximity of the Bluetooth device and output an indication that a near field communications detect event has occurred;
in response to the near field communications detect event, unlock the Bluetooth Secure Simple Pairing module for a predetermined unlock time interval and, during the predetermined unlock time interval, pair the headset base with the Bluetooth device by exchanging pairing information on a 2.4 GHz physical layer using the Bluetooth Secure Simple Pairing process; and
lock the Bluetooth Secure Simple Pairing module to the locked state upon completion of the predetermined unlock time interval.

8. The headset base of claim 7, further comprising a public switched telephone network (PSTN) interface.

9. The headset base of claim 7, further comprising a computing device wired interface.

10. The headset base of claim 9, wherein the computing device wired interface is a USB interface.

11. The headset base of claim 7, wherein the wireless communications transceiver is a DECT transceiver.

12. The headset base of claim 7, wherein the one or more application programs further comprise computer executable instructions configured to:
transmit and receive an audio signal between the headset base and the Bluetooth device over a Bluetooth link; and
transmit and receive the audio signal between the headset base and the wireless headset using the wireless communications transceiver.

13. The headset base of claim 12, wherein the audio signal comprises telephony voice communications between a wearer of the wireless headset and a far-end call participant.

14. A method comprising:
operating a headset base device in either a pairing mode unlocked state or a pairing mode locked state, wherein during the pairing mode locked state the headset base device is locked from performing a pairing operation and rejects all pairing requests;
receiving at the headset base device during the locked state a pairing request from a Bluetooth device, the pairing request comprising pairing credentials, wherein the pairing credentials comprise a Bluetooth device address;
rejecting the pairing request;
detecting with a first near field communications device disposed at the headset base device, while the headset base device is in the pairing mode locked state, a physical proximity of the Bluetooth device;
outputting an indication that a near field communications detect event has occurred;
in response to the near field communications detect event, entering the pairing mode unlocked state at the headset base device for a predetermined unlock time interval and, during the predetermined unlock time interval, pairing the headset base device and the Bluetooth device by exchanging pairing information on a 2.4 GHz physical layer using a Bluetooth Secure Simple Pairing process; and
entering the pairing mode locked state upon completion of the predetermined unlock time interval.

15. The method of claim 14, further comprising:
forming a Bluetooth link between the headset base device and the Bluetooth device following pairing;
transmitting and receiving an audio signal between the headset base device and the Bluetooth device over the Bluetooth link; and
transmitting and receiving the audio signal between the headset base device and a wireless headset using a second wireless communications link.

16. The method of claim 15, wherein the second wireless communications link comprises a DECT link between a first DECT transceiver disposed at the headset base device and a second DECT transceiver disposed at the wireless headset, and wherein the audio signal comprises telephony voice communications between a wearer of the wireless headset and a far-end call participant.

* * * * *